(12) United States Patent
Yasui et al.

(10) Patent No.: US 12,291,226 B2
(45) Date of Patent: May 6, 2025

(54) DRIVING ASSISTANCE DEVICE AND DRIVING ASSISTANCE METHOD

(71) Applicant: HONDA MOTOR CO., LTD., Tokyo (JP)

(72) Inventors: Yuji Yasui, Wako (JP); Aya Miura, Wako (JP); Kenjiro Torii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 17/989,836

(22) Filed: Nov. 18, 2022

(65) Prior Publication Data
US 2023/0159045 A1 May 25, 2023

(30) Foreign Application Priority Data

Nov. 22, 2021 (JP) .................................. 2021-189633

(51) Int. Cl.
*B60W 50/14* (2020.01)
*B60K 35/00* (2024.01)
(Continued)

(52) U.S. Cl.
CPC ............ *B60W 50/14* (2013.01); *B60K 35/00* (2013.01); *B60W 40/04* (2013.01); *B60K 35/26* (2024.01);
(Continued)

(58) Field of Classification Search
CPC ................ B60W 50/14; B60W 40/04; B60W 2050/143; B60W 2554/4041; B60K 35/00; B60K 35/26
See application file for complete search history.

(56) References Cited

U.S. PATENT DOCUMENTS

| 5,450,057 A | 9/1995 | Watanabe |
| 2006/0255956 A1 | 11/2006 | Arakawa et al. |

(Continued)

FOREIGN PATENT DOCUMENTS

| JP | 05-126948 | 5/1993 |
| JP | 06-055984 | 3/1994 |

(Continued)

OTHER PUBLICATIONS

Japanese Office Action for Japanese Patent Application No. 2021-189633 mailed May 28, 2024.

*Primary Examiner* — Nabil H Syed
*Assistant Examiner* — Cal J Eustaquio
(74) *Attorney, Agent, or Firm* — Amin, Turocy & Watson, LLP

(57) ABSTRACT

A driving assistance device includes a storage device storing a program and a hardware processor connected to the storage device. The hardware processor reads and executes the program stored in the storage device to recognize a risky physical object located near a mobile object on the basis of an output of a physical object detection device, cause at least one speaker to output a notification sound on the basis of a position of the risky physical object, and when the notification sound is output, cause the at least one speaker to output a first notification sound if the risky physical object is located in a first region including a region in front of the mobile object and cause the at least one speaker to output a second notification sound if the risky physical object is located in a second region including a region behind the mobile object. The first notification sound is a sound having a pitch different from that of the second notification sound.

20 Claims, 13 Drawing Sheets

(51) Int. Cl.
*B60K 35/26* (2024.01)
*B60K 35/28* (2024.01)
*B60K 35/29* (2024.01)
*B60W 40/04* (2006.01)

(52) U.S. Cl.
CPC .............. *B60K 35/28* (2024.01); *B60K 35/29* (2024.01); *B60K 2360/178* (2024.01); *B60K 2360/1868* (2024.01); *B60W 2050/143* (2013.01); *B60W 2554/4041* (2020.02)

(56) References Cited

U.S. PATENT DOCUMENTS

| | | | |
|---|---|---|---|
| 2007/0124078 A1* | 5/2007 | Vinje ..................... | G08G 1/161 |
| | | | 701/469 |
| 2017/0096104 A1 | 4/2017 | Kelly et al. | |
| 2021/0016791 A1* | 1/2021 | Elkins ................... | B60W 50/16 |
| 2021/0211804 A1* | 7/2021 | Miyasaka ................ | H04R 1/22 |

FOREIGN PATENT DOCUMENTS

| JP | 2006-318049 | 11/2006 |
|---|---|---|
| JP | 2008-257636 | 10/2008 |
| JP | 2013-015969 | 1/2013 |
| JP | 6587776 | 10/2019 |

* cited by examiner

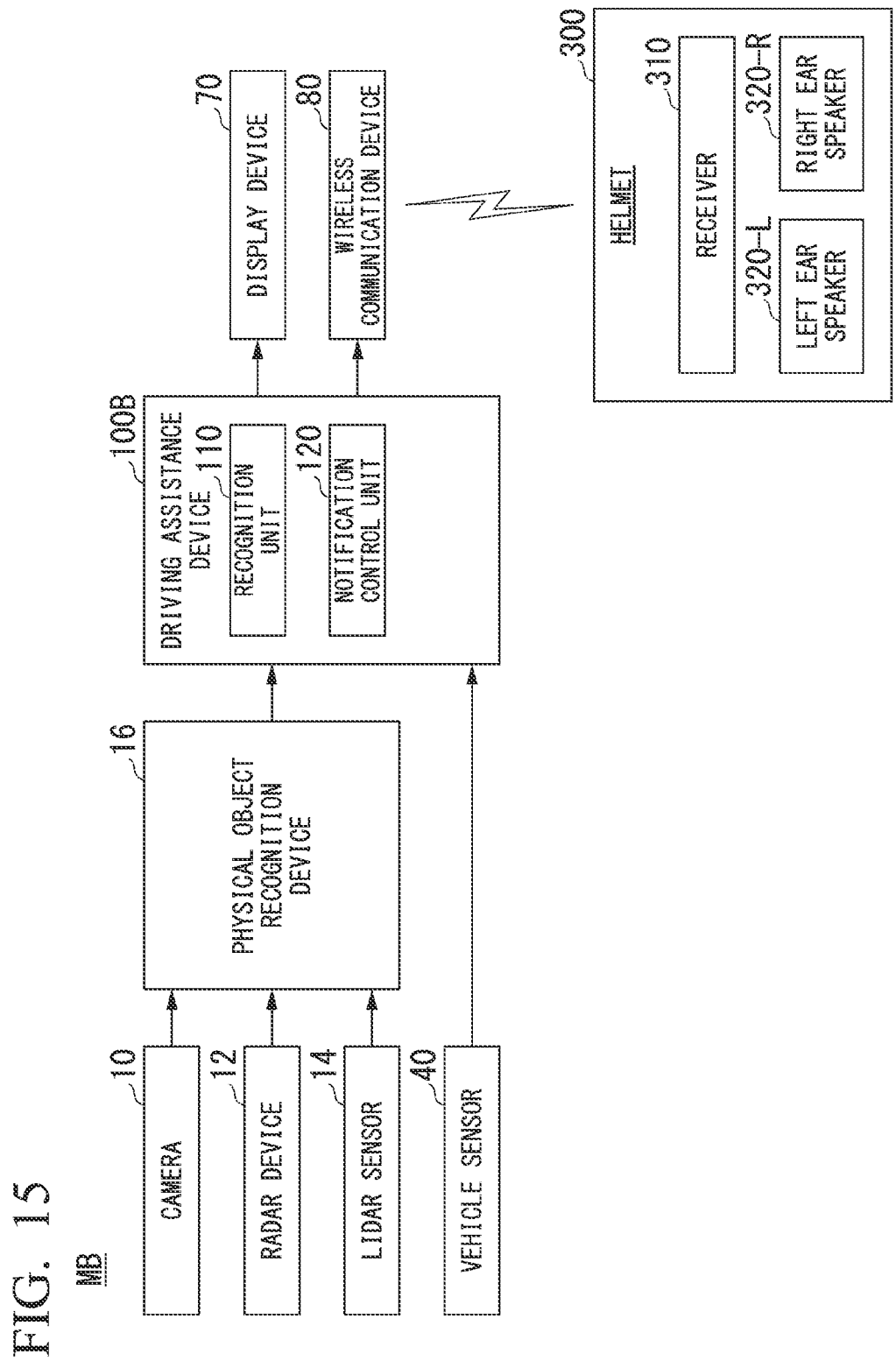

DRIVING ASSISTANCE DEVICE AND DRIVING ASSISTANCE METHOD

CROSS-REFERENCE TO RELATED APPLICATION

Priority is claimed on Japanese Patent Application No. 2021-189633, filed Nov. 22, 2021, the content of which is incorporated herein by reference.

BACKGROUND

Field of the Invention

The present invention relates to a driving assistance device and a driving assistance method.

Description of Related Art

In the related art, technologies for allowing a driver (an occupant) to be aware of an attention target located near a mobile object by sound are known. Among the technologies, there is technology for generating sounds at a position and in a direction where attention is aroused through sound image localization (Japanese Patent No. 6587776).

SUMMARY

However, sound image localization in the cabin of a mobile object may not be ideally effective. For example, in the case of a vehicle, a sound generated near rear seats of the vehicle is reflected by a front windshield and a driver may feel as if the sound were coming from the front. As described above, in the related art, it may be difficult for an occupant to intuitively recognize a position or direction of a risky physical object located near the mobile object.

The present invention has been made in consideration of such circumstances and an objective of the present invention is to provide a driving assistance device and a driving assistance method capable of allowing an occupant to intuitively recognize a position or direction of a risky physical object located near a mobile object.

A driving assistance device and a driving assistance method according to the present invention adopt the following configurations.

(1): According to an aspect of the present invention, there is provided a driving assistance device including: a storage device storing a program; and a hardware processor connected to the storage device, wherein the hardware processor reads and executes the program stored in the storage device to: recognize a risky physical object located near a mobile object on the basis of an output of a physical object detection device, cause at least one speaker to output a notification sound on the basis of a position of the risky physical object, and when the notification sound is output, cause the at least one speaker to output a first notification sound if the risky physical object is located in a first region including a region in front of the mobile object and cause the at least one speaker to output a second notification sound if the risky physical object is located in a second region including a region behind the mobile object, and wherein the first notification sound is a sound having a pitch different from that of the second notification sound.

(2): In the above-described aspect (1), the first notification sound is a sound higher than the second notification sound.

(3): In the above-described aspect (1), the first notification sound includes a first fundamental sound and a first additional sound that is an integer-order harmonic overtone having an integer multiple of a frequency of the first fundamental sound.

(4): In the above-described aspect (1), the second notification sound includes a second fundamental sound and a second additional sound having a frequency different from a frequency that is 1/n (n is a natural number) times a frequency of the second fundamental sound.

(5): According to another aspect of the present invention, there is provided a driving assistance device including: a storage device storing a program; and a hardware processor connected to the storage device, wherein the hardware processor reads and executes the program stored in the storage device to: recognize a risky physical object located near a mobile object on the basis of an output of a physical object detection device, cause at least one speaker to output a notification sound on the basis of a position of the risky physical object, and when the notification sound is output, cause the at least one speaker to output a first notification sound if the risky physical object is located in a first region including a region in front of the mobile object and cause the at least one speaker to output a second notification sound if the risky physical object is located in a second region including a region behind the mobile object, and wherein one of the first notification sound and the second notification sound is a sound including a fundamental sound A and an integer-order harmonic overtone having an integer multiple of a frequency of the fundamental sound A and the other of the first notification sound and the second notification sound is a sound including a fundamental sound B and an additional sound having a frequency different from a frequency that is 1/n (n is a natural number) times a frequency of the fundamental sound B.

(6): In the above-described aspect (5), the first notification sound includes a first fundamental sound and a first additional sound that is an integer-order harmonic overtone having an integer multiple of a frequency of the first fundamental sound.

(7): In the above-described aspect (3) or (6), the hardware processor changes a mode of the first additional sound on the basis of a position of the risky physical object within the first region when the risky physical object is located in the first region.

(8): In the above-described aspect (7), the hardware processor increases the number of types of frequencies of the first additional sound as a direction of the risky physical object viewed from the mobile object is close to a traveling direction of the mobile object when the risky physical object is located in the first region.

(9): In the above-described aspect (7), the hardware processor increases the number of types of frequencies of the first additional sound when the risky physical object is located in a first center region located in a center portion of the first region in a width direction of the mobile object as compared with when the risky physical object is in one of a first left side region and a first right side region located at both left and right sides of the first center region of the first region.

(10): In the above-described aspect (5), the second notification sound includes a second fundamental sound and a second additional sound having a frequency different from a frequency that is 1/n (n is a natural number) times a frequency of the second fundamental sound.

(11): In the above-described aspect (4) or (10), the hardware processor changes a mode of the second additional sound on the basis of a position of the risky physical object within the second region when the risky physical object is located in the second region.

(12): In the above-described aspect (11), the hardware processor raises a volume of the second additional sound as a direction of the risky physical object viewed from the mobile object is close to a direction opposite to a traveling direction of the mobile object when the risky physical object is located in the second region.

(13): In the above-described aspect (11), the hardware processor raises a volume of the second additional sound when the risky physical object is located in a second center region located in a center portion of the second region in a width direction of the mobile object as compared with when the risky physical object is in one of a second left side region and a second right side region located at both left and right sides of the second center region of the second region.

(14): In the above-described aspect (1) or (5), the hardware processor decreases a tempo of the first additional sound as a direction of the risky physical object viewed from the mobile object is close to a traveling direction of the mobile object when the risky physical object is located in the first region.

(15): In the above-described aspect (1) or (5), the hardware processor increases a tempo of the second additional sound as a direction of the risky physical object viewed from the mobile object is close to a direction opposite to a traveling direction of the mobile object when the risky physical object is located in the second region.

(16): In the above-described aspect (1) or (5), the hardware processor increases a tempo of the first notification sound or the second additional sound as a distance between the mobile object and the risky physical object decreases.

(17): In the above-described aspect (1) or (5), the at least one speaker includes a plurality of speakers, and the hardware processor decides on a position where a sound image of the first notification sound is localized on the basis of a position of the risky physical object within the first region when the risky physical object is located in the first region and decides on a position where a sound image of the second notification sound is localized on the basis of a position of the risky physical object within the second region when the risky physical object is located in the second region.

(18): According to yet another aspect of the present invention, there is provided a driving assistance method, which is executed by a computer mounted in a mobile object, the driving assistance method including: recognizing a risky physical object located near the mobile object on the basis of an output of a physical object detection device; and causing at least one speaker to output a notification sound on the basis of a position of the risky physical object, wherein, when the notification sound is output, the computer causes the at least one speaker to output a first notification sound if the risky physical object is located in a first region including a region in front of the mobile object and causes the at least one speaker to output a second notification sound if the risky physical object is located in a second region including a region behind the mobile object, and wherein the first notification sound is a sound having a pitch different from that of the second notification sound.

(19): According to yet another aspect of the present invention, there is provided a driving assistance method, which is executed by a computer mounted in a mobile object, the driving assistance method including: recognizing a risky physical object located near the mobile object on the basis of an output of a physical object detection device; and causing at least one speaker to output a notification sound on the basis of a position of the risky physical object, wherein, when the notification sound is output, the computer causes the at least one speaker to output a first notification sound if the risky physical object is located in a first region including a region in front of the mobile object and causes the at least one speaker to output a second notification sound if the risky physical object is located in a second region including a region behind the mobile object, and wherein one of the first notification sound and the second notification sound is a sound including a fundamental sound A and an integer-order harmonic overtone having an integer multiple of a frequency of the fundamental sound A and the other of the first notification sound and the second notification sound is a sound including a fundamental sound B and an additional sound having a frequency different from a frequency that is 1/n (n is a natural number) times a frequency of the fundamental sound B.

According to the above-described aspects (1) to (20), it is possible to allow an occupant to intuitively recognize a position or direction of a risky physical object located near a mobile object.

BRIEF DESCRIPTION OF THE DRAWINGS

FIG. 15 is a diagram showing equipment mounted in a two-wheeled vehicle based on a driving assistance device according to a fourth embodiment.

DESCRIPTION OF EMBODIMENTS

Hereinafter, embodiments of a driving assistance device and a driving assistance method of the present invention will be described with reference to the drawings. The driving assistance device is a device that supports driving of a mobile object. The mobile object includes vehicles such as three- or four-wheeled vehicles, two-wheeled vehicles, micromobility, and the like, and may include any mobile object into or on which a person (a driver) gets. In first to third embodiments to be described below, the mobile object is assumed to be a four-wheeled vehicle and the vehicle equipped with the driving assistance device is referred to as a vehicle M. Also, in a fourth embodiment, the mobile object is assumed to be a two-wheeled vehicle.

[Configuration]

Figure 1:
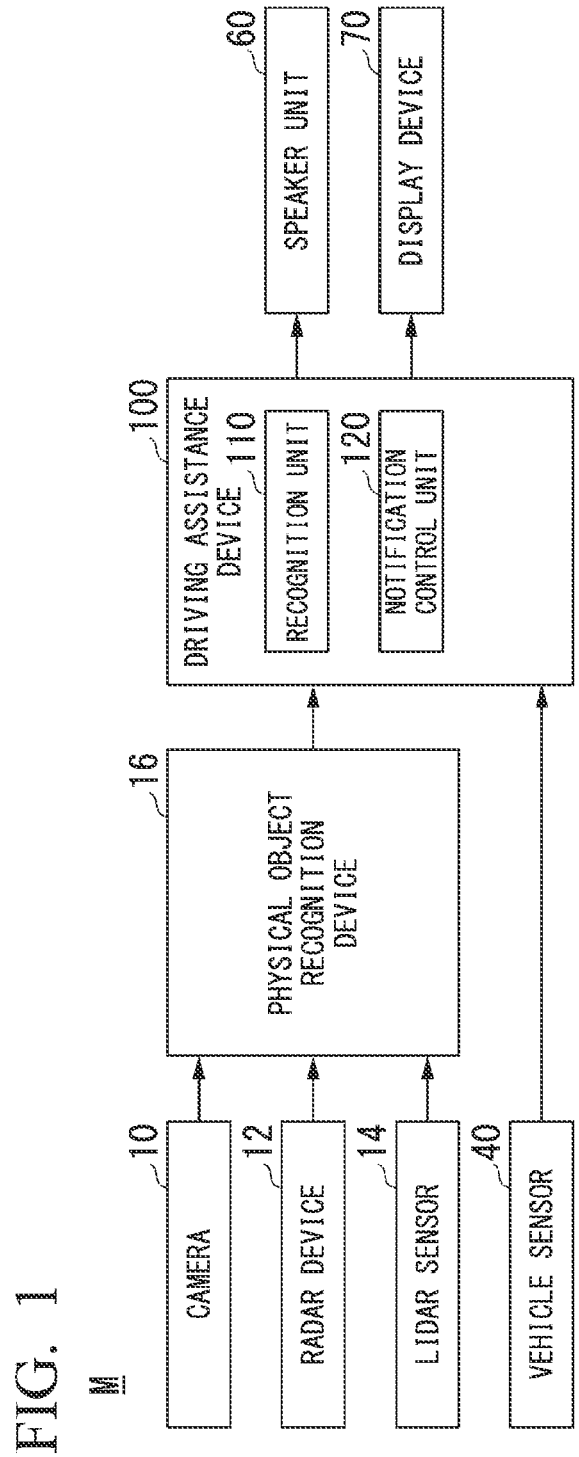
FIG. 1 is a diagram showing equipment mounted in a vehicle M based on a driving assistance device according to a first embodiment.

FIG. 1 is a diagram showing equipment mounted in the vehicle M based on a driving assistance device 100. The vehicle M may be any one of an automobile powered by an internal combustion engine such as a diesel engine or a gasoline engine, an electric vehicle powered by an electric motor, and a hybrid vehicle having both an internal combustion engine and an electric motor.

For example, the vehicle M is equipped with a camera 10, a radar device 12, a light detection and ranging (LIDAR) sensor 14, a physical object recognition device 16, a vehicle sensor 40, a speaker unit 60, a display device 70, a driving assistance device 100, and the like. In the present embodiment, although illustrations and description of components for causing the vehicle M to travel, for example, driving operation elements, a drive device such as an engine or a motor, a steering device, a brake device, and the like are omitted, these components may be mounted in the vehicle M.

For example, the camera 10 is a digital camera using a solid-state imaging element such as a charge-coupled device (CCD) or a complementary metal-oxide semiconductor (CMOS). The camera 10 is attached to any position on the vehicle M in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera. A plurality of cameras 10 having detection directions different from each other may be mounted in the vehicle M.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and a speed of the physical object in a frequency modulated continuous wave (FM-CW) scheme. A plurality of radar devices 12 having detection direction different from each other may be mounted in the vehicle M.

The LIDAR sensor 14 radiates light (or electromagnetic waves having a wavelength close to light) around the vehicle M and measures scattered light. The LIDAR sensor 14 detects a distance to a target on the basis of time from light emission to light reception. The radiated light is, for example, pulsed laser light. The LIDAR sensor 14 is attached to any position on the vehicle M.

The physical object recognition device 16 recognizes a physical object by analyzing an image captured by the camera 10. The physical object recognition device 16 performs a sensor fusion process on detection results from some or all of the camera 10, the radar device 12, and the LIDAR sensor 14 to recognize a position (a distance to and an angle), a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are.

An equipment group including the camera 10, the radar device 12, the LIDAR sensor 14, and the physical object recognition device 16 is an example of a "physical object detection device." A simpler configuration, for example, a configuration of the camera 10 and the physical object recognition device 16 or the camera 10 and the radar device 12, may be mounted in the vehicle M as the "physical object detection device." When the physical object recognition device 16 is omitted, a function of analyzing an image captured by the camera 10 may be installed in the driving assistance device 100. Also, the "physical object detection device" may include an ultrasonic sensor.

The vehicle sensor 40 includes a vehicle speed sensor that detects the speed of the vehicle M, an acceleration sensor that detects the acceleration thereof, a yaw rate sensor that detects an angular velocity about a vertical axis, a direction sensor that detects the direction of the vehicle M, and the like.

Figure 2:
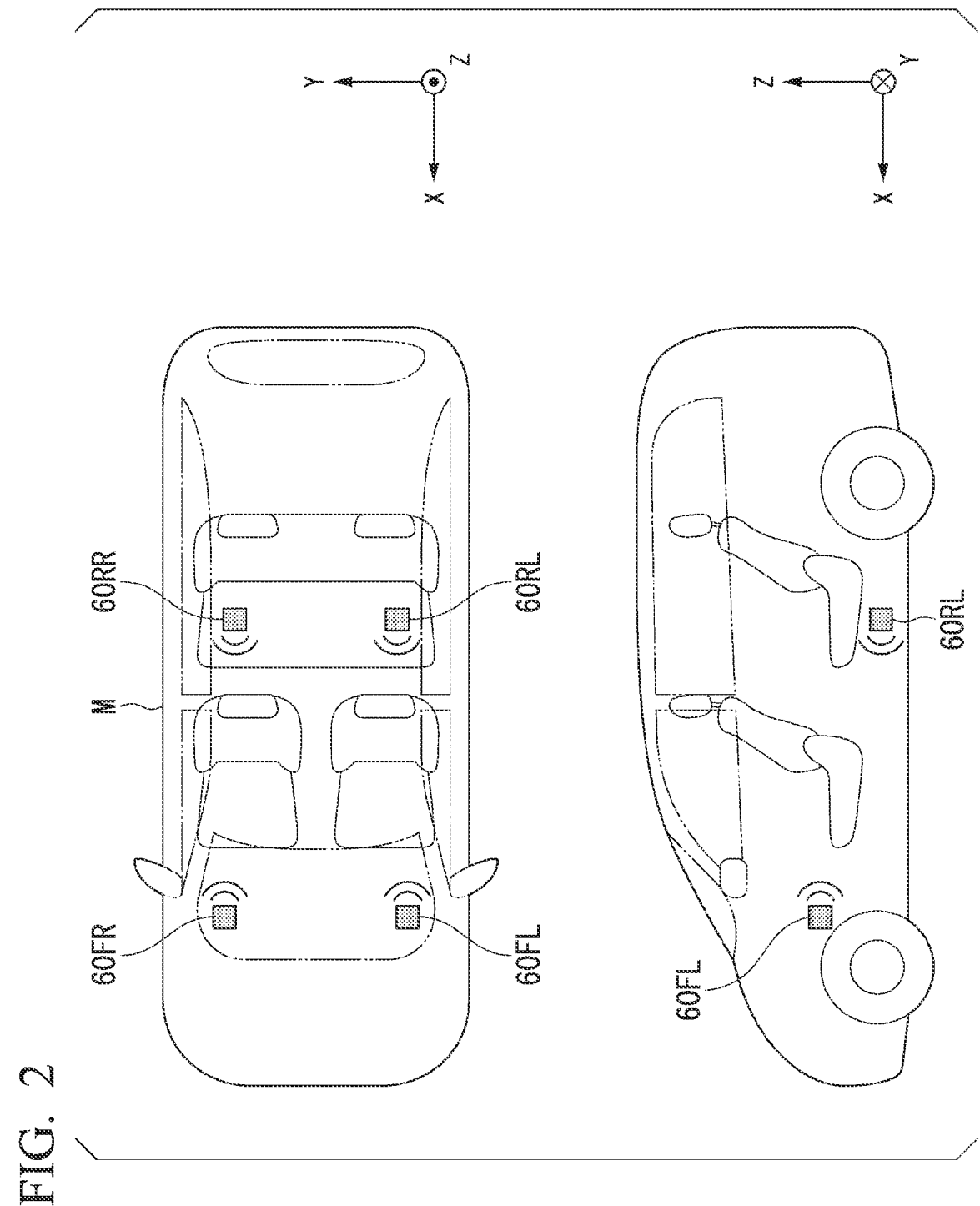
FIG. 2 is a configuration diagram of a speaker unit.

FIG. 2 is a configuration diagram of the speaker unit 60. The speaker unit 60 includes, for example, four speakers 60FR, 60FL, 60RR, and 60RL. For example, the speaker 60FR is provided between a right end of an instrument panel in the cabin of the vehicle M and a right door, the speaker 60FL is provided between a left end of the instrument panel in the cabin of the vehicle M and a left door, the speaker 60RR is provided under a seating surface of a right rear seat in the cabin of the vehicle M, and the speaker 60RL is provided under a seating surface of a left rear seat in the cabin of the vehicle M. The speaker unit 60 may include a pair of left and right speakers. Also, one speaker may be mounted in the vehicle M instead of the speaker unit 60.

Figure 3:
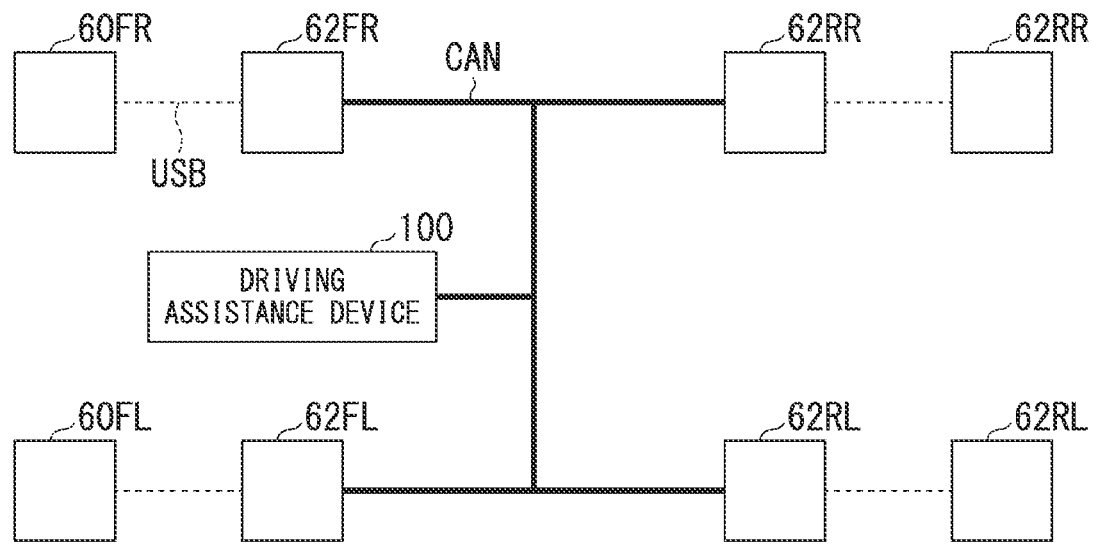
FIG. 3 is a diagram showing an example of a hardware configuration of a speaker unit.

FIG. 3 is a diagram showing an example of a hardware configuration of the speaker unit 60. For example, control processors 62FR, 62FL, 62RR, and 62RL are attached to the speakers 60FR, 60FL, 60RR, and 60RL, respectively. A universal serial bus (USB) is connected between the speaker and the control processor and the control processor is connected to the driving assistance device 100 via a controller area network (CAN) bus or the like.

Figure 4:
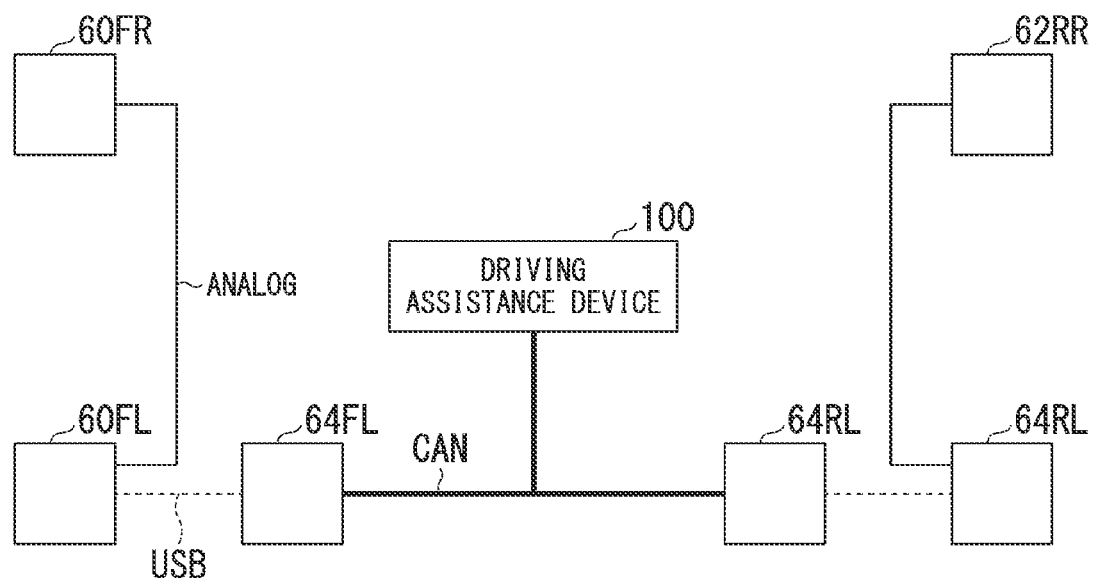
FIG. 4 is a diagram showing another example of the hardware configuration of the speaker unit.

FIG. 4 is a diagram showing another example of the hardware configuration of the speaker unit 60. For example, the speakers 60FR and 60FL are connected in an analog mode and the speaker 60FL and the control processor 64FL are connected via the USB. The speakers 60RR and 60RL are connected in the analog mode and the speaker 60RL and the control processor 64RL are connected via the USB. The control processors 64FL and 64RL are connected to the driving assistance device 100 via the CAN bus or the like.

In this way, the control processor may be attached in correspondence with each speaker or the control processor may be attached in correspondence with a plurality of speakers. The control processor causes the corresponding speaker to output a notification sound (including a first notification sound and a second notification sound) having a frequency indicated by the driving assistance device 100, which will be described below.

The display device 70 is, for example, a touch panel, and is attached to any position in the cabin of the vehicle M. The display device 70 receives various types of operations for the driving assistance device 100 and displays an image indicated by the driving assistance device 100 or the like.

Referring back to FIG. 1, the driving assistance device 100 includes, for example, a recognition unit 110 and a notification control unit 120. These components are implemented by executing a program (software) by a hardware processor such as a central processing unit (CPU). Some or all of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory or may be stored in a removable storage medium (a non-transitory storage medium) such as a DVD or a CD-ROM and installed in the storage device of the driving assistance device 100 when the storage medium is mounted in a drive device.

[Risky Physical Object]

The recognition unit 110 recognizes a risky physical object located near the vehicle M on the basis of at least some of the outputs of the camera 10, the radar device 12, the LIDAR sensor 14, and the physical object recognition device 16. Risky physical objects are, for example, external mobile objects, in other words, traffic participants and other mobile objects. Specifically, risky physical objects are pedestrians, bicycles on which people are riding, vehicles, and the like. Additionally, risky physical objects may include static obstacles such as abandoned objects, parked vehicles, utility poles, and the like. "Recognizing a risky physical object" is recognizing the presence of a risky physical object classified as described above and the position of the risky physical object relative to the vehicle M. When information of a position of physical object is input together with information of a type of physical object from the physical object recognition device 16, the recognition unit 110 may recognize the risky physical object with reference to the type of physical object or may recognize the risky physical object by analyzing an image captured by the camera 10 by itself. Also, the recognition unit 110 may recognize the risky physical object on the basis of the speed of the physical object, the reflectance of electromagnetic waves, and the like.

[Notification Target Region]

Figure 5:
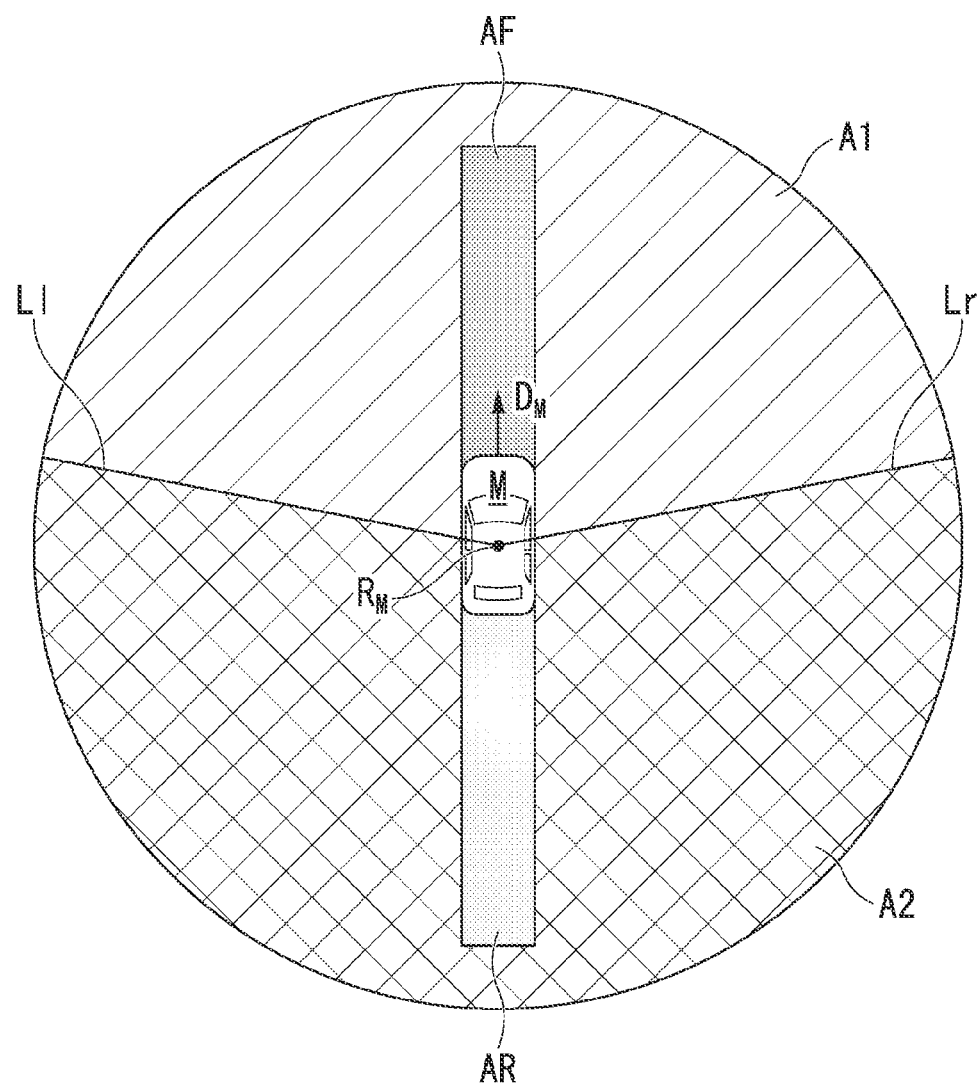
FIG. 5 is a diagram for describing a first region and a second region.

The notification control unit 120 causes the speaker unit 60 to output the notification sound (via the control processor) on the basis of the position of the risky physical object. The notification control unit 120 causes the speaker unit 60 to output a first notification sound when the risky physical object is located in a first region including a region in front of the vehicle M and causes the speaker unit 60 to output a second notification sound when the risky physical object is located in a second region including a region behind the vehicle M. FIG. 5 is a diagram for describing a first region A1 and a second region A2. In FIG. 5, $D_M$ denotes a traveling direction of the vehicle M (a forward direction or a normal traveling direction). The traveling direction $D_M$ of the vehicle M may be a direction of the central axis of the vehicle M, a direction of an instantaneous movement vector, or a direction of a lane centerline of a road on which the vehicle M is located. A region AF is a front region. The front region AF is, for example, a region where lines obtained by extending left and right side ends of the vehicle M to a front side of the vehicle M are set as left and right outer edge lines and which extends from a front end of the vehicle M to a position at a prescribed distance therefrom. Also, the region AR is a rear region. For example, the rear region AR is, for example, a region where lines obtained by extending the left and right side ends of the vehicle M to a rear side of the vehicle M are set as left and right outer edge lines and which extends from a rear end of the vehicle M to a position at a prescribed distance (which may be the same as or different from the prescribed distance in the front region AF) therefrom. The first region A1 is a region that includes at least the front region AF and extends from the side of the vehicle M to the front side. The second region A2 is a region that includes at least the rear region AR and extends from the side of the vehicle M to the rear side. The first region A1 and the second region A2 are set not to overlap each other. A boundary line between the first region A1 and the second region A2 passes through a reference point RM of the vehicle M and extends to the left and right sides of the vehicle M. This boundary line does not need to be exactly identical to the width direction of the vehicle M and may be inclined forward or backward using the reference point of the vehicle M as a base point. In FIG. 5, line segments Lr and L1 extending diagonally forward from the reference point RM of the vehicle M are assumed to be boundary lines between the first region A1 and the second region A2. Also, there may be a certain degree of gap between the first region A1 and the second region A2.

[Notification Sound]

In the first embodiment, the first notification sound has a pitch different from that of the second notification sound. Thereby, the driver can intuitively ascertain the position of a risky physical object by recognizing from which of the forward and rearward directions a high notification sound is output and from which direction a low notification sound is output.

Figure 6:
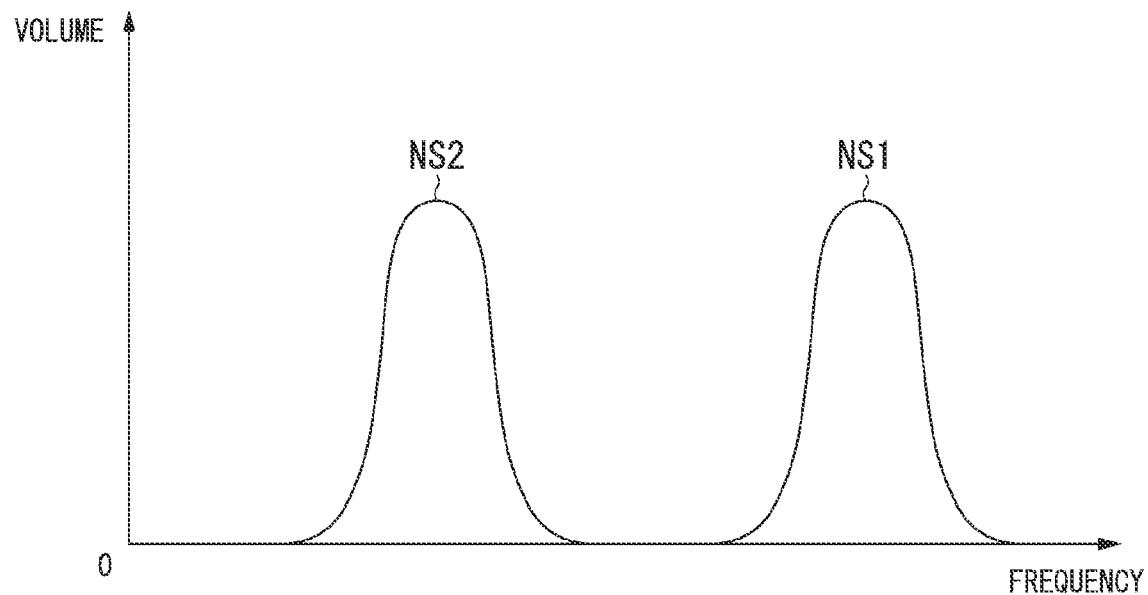
FIG. 6 is a diagram illustrating the meaning of the fact that a first notification sound is higher than a second notification sound.
Figure 6:
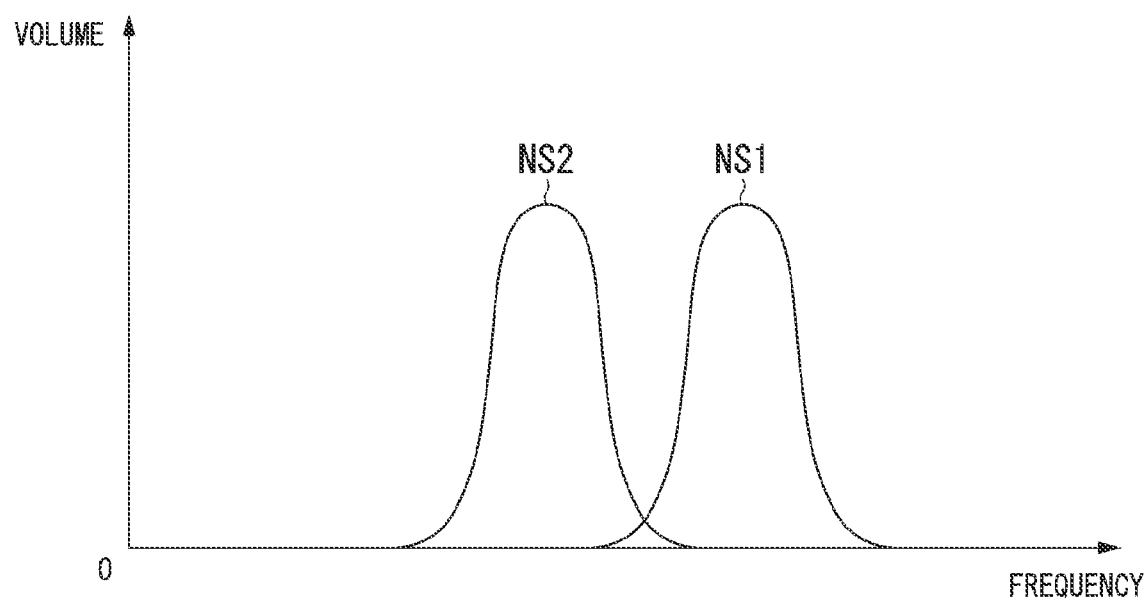

As an example, the first notification sound is higher than the second notification sound. A "sound higher than the second notification sound" indicates, for example, that all frequency components of the sound constituting the first notification sound are higher in frequency than frequency components of the sound constituting the second notification sound. Alternatively, the "sound higher than the second notification sound" may indicate that some of the frequency components of the sound constituting the first notification sound overlap the frequency components of the sound constituting the second notification sound, but are generally higher in frequency (for example, a weighted sum obtained by weighting the frequency of the sound constituting the first notification sound by volume is higher than that of the second notification sound). FIG. 6 is a diagram illustrating the meaning of the fact that a first notification sound NS1 is higher than a second notification sound NS2. The upper diagram of FIG. 6 is a diagram showing a state in which all frequency components of a sound constituting the first notification sound NS1 are higher in frequency than frequency components of a sound constituting the second notification sound NS2 and the lower diagram of FIG. 6 is a diagram showing a state in which some of the frequency components of the sound constituting the first notification sound NS1 overlap the frequency components of the sound constituting the second notification sound NS2, but are generally higher in frequency. In the following description, it is assumed that all the frequency components of the sound constituting the first notification sound NS1 are higher in frequency than the frequency components of the sound constituting the second notification sound NS2.

Generally, a high sound attracts people's attention more than a low sound. Therefore, a high notification sound is generated for a risky physical object located in the first region A1, i.e., a risky physical object located in front of the vehicle M, so that a driver's attention can be more quickly aroused. Also, it is possible to prevent the driver from being bothered by excessive notifications by outputting a low notification sound for a risky physical object located in the second region A2, i.e., a risky physical object located behind the vehicle M.

Also, in contrast to the above, the first notification sound may be lower than the second notification sound. As described above, the driver can intuitively ascertain the position of a risky physical object by recognizing from which of the forward and rearward directions a high notification sound is output and from which direction a low notification sound is output.

[Integer-Order Harmonic Overtone, Etc.]

The notification control unit 120 may cause the speaker unit 60 to output a sound including a first fundamental sound NS1-$b$ and a first additional sound NS1-$p$ ($p=1, 2, \ldots$) that is an integer-order harmonic overtone having an integer multiple of a frequency of the first fundamental sound NS1-$b$ as the first notification sound NS1. Also, the notification control unit 120 may cause the speaker unit 60 to output a sound including a second fundamental sound NS2-$b$ and a second additional sound NS2-$q$ ($q=1, 2, \ldots$) having a frequency different from a frequency that is 1/n times (n is a natural number) a frequency of the second fundamental sound NS2-$b$ as the second notification sound NS2. Further, the second additional sound NS2-$q$ may be a sound that does not correspond to an integer-order harmonic overtone having an integer multiple of a frequency of the second fundamental sound NS2-$b$. In this case, the first fundamental sound NS1-$b$ is an example of a "fundamental sound A" and the second fundamental sound NS2-$b$ is an example of a "fundamental sound B."

Figure 7:
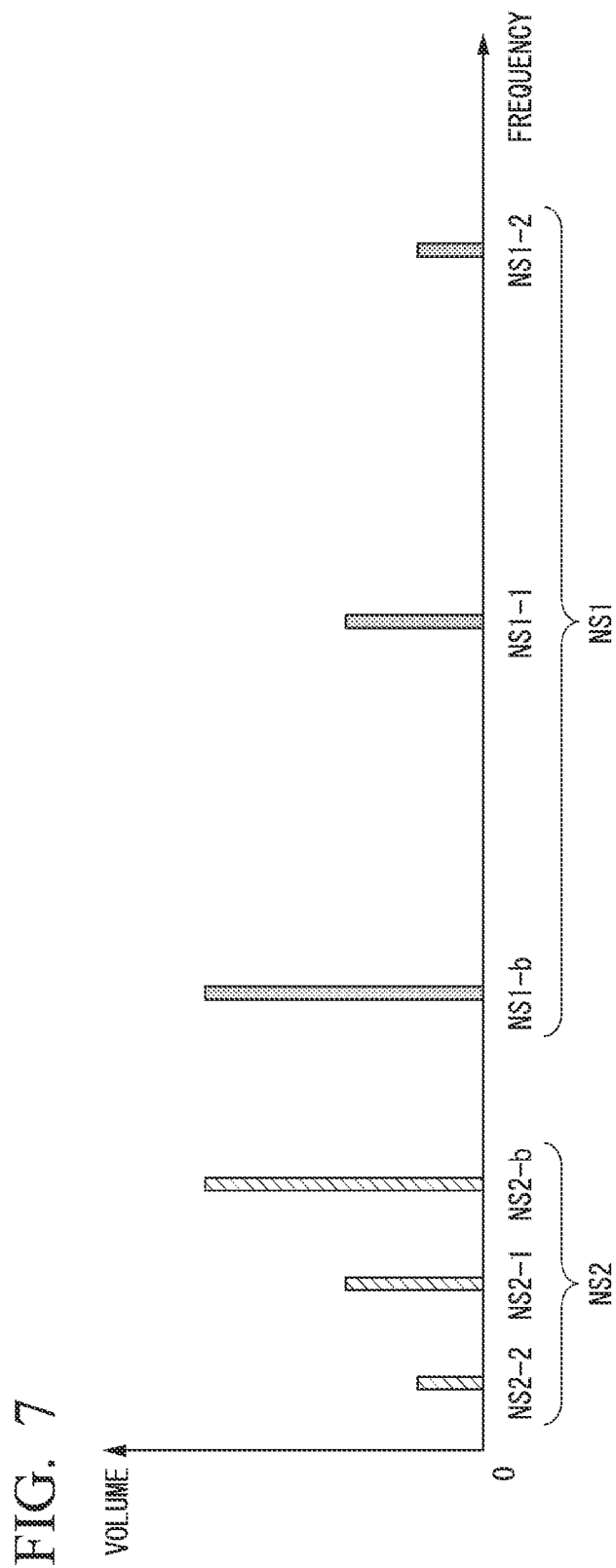
FIG. 7 is a diagram for describing configurations of a first notification sound and a second notification sound.

FIG. 7 is a diagram for describing configurations of the first notification sound NS1 and the second notification sound NS2. The first fundamental sound NS1-$b$ is, for example, higher than the second fundamental sound NS2-$b$, but may have the same pitch (same frequency) as the second fundamental sound NS2-$b$. In the illustrated example, the first notification sound NS1 includes a first additional sound NS1-1 and a first additional sound NS1-2. Because the first additional sound NS1-1 and the first additional sound NS1-2 are integer-order harmonic overtones each having an integer multiple of a frequency of the first fundamental sound NS1-$b$, they are sounds higher than the first fundamental sound NS1-$b$. Also, the second notification sound NS2 includes a second additional sound NS2-1 and a second additional sound NS2-2. Although a sound having "a frequency different from a frequency that is 1/n times a frequency of the second fundamental sound NS2-$b$" can be either one of a sound higher than the second fundamental sound NS2-$b$ and a sound lower than the second fundamental sound NS2-$b$, the notification control unit 120 causes the speaker unit 60 to output, for example, only a sound lower than the second fundamental sound NS2-$b$ as the second additional sound NS2-$q$.

Because a sound including a fundamental sound and an integer-order harmonic overtone is clear to the human ear, whereas a sound in which a relationship between constituent sounds is not associated with an integer-order harmonic overtone is unclear to the human ear, the driver's attention can be more quickly aroused by configuring the first notification sound NS1 and the second notification sound as described above and outputting a notification sound including a fundamental sound and an integer-order harmonic overtone having an integer multiple of a frequency of the fundamental sound with respect to a risky physical object located in the first region A1, i.e., a risky physical object located in front of the vehicle M. Also, it is possible to prevent the driver from being bothered by excessive notifications by outputting a sound in which a relationship between constituent sounds is not associated with an integer-order harmonic overtone with respect to the risky physical object located in the second region A2, i.e., the risky physical object located behind the vehicle M.

In contrast to the above, the notification control unit 120 may cause the speaker unit 60 to output a sound including a first fundamental sound and a first additional sound having a frequency different from a frequency that is 1/n times a frequency of the first fundamental sound as the first notification sound. Also, the notification control unit 120 may cause the speaker unit 60 to output a sound including a second fundamental sound and a second additional sound that is an integer-order harmonic overtone having an integer multiple of a frequency of the second fundamental sound as the second notification sound. In this case, the first fundamental sound is an example of a "fundamental sound B" and the second fundamental sound is an example of a "fundamental sound A." In both cases described above or in this case, the driver can intuitively ascertain the position of a risky physical object by recognizing from which of the forward and rearward directions a sound including an integer-order harmonic overtone is output and from which direction a sound including an additional sound having a frequency different from a frequency that is 1/n times the frequency of the fundamental sound is output.

Figure 8:
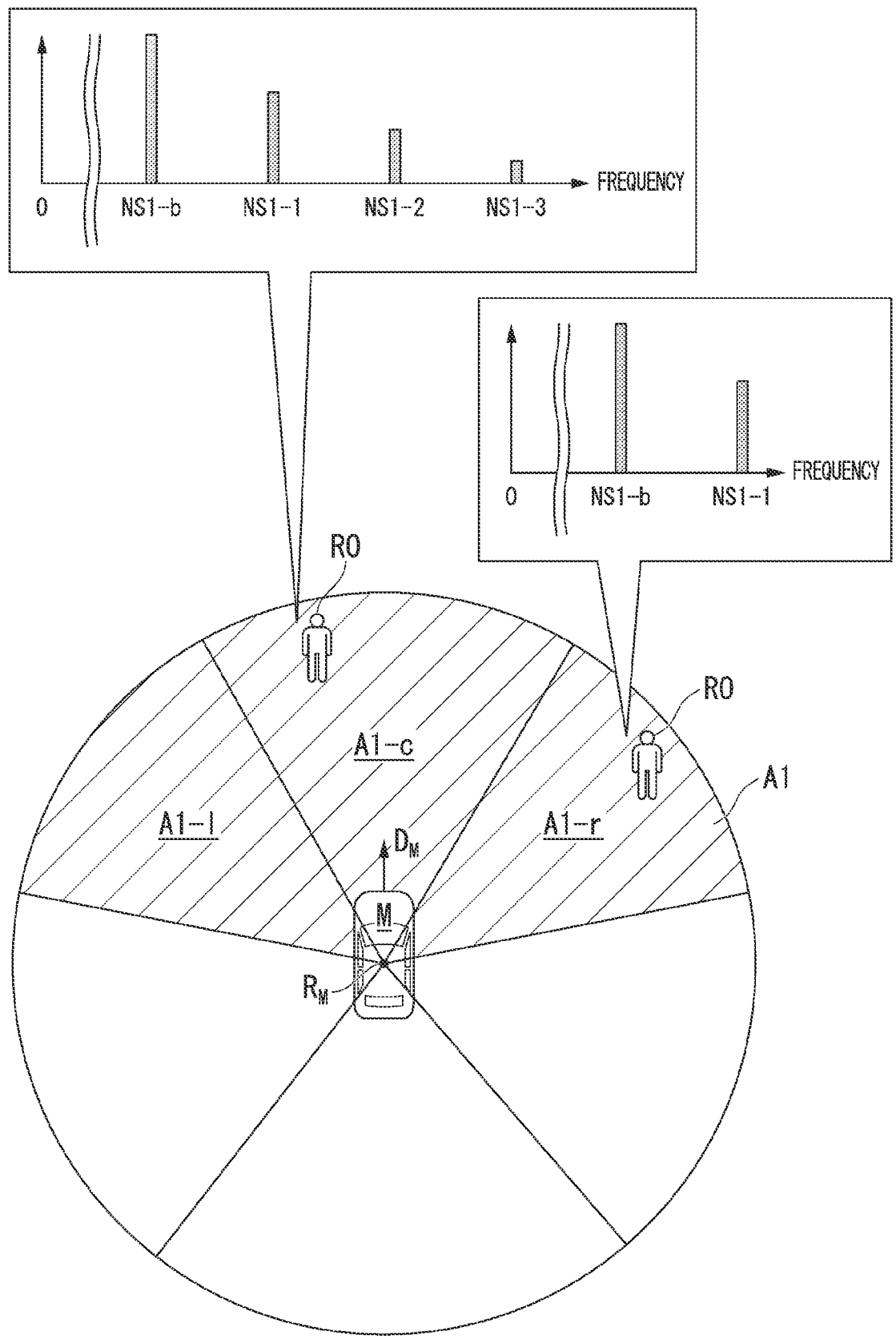
FIG. 8 is a diagram for describing an example in which the number of types of frequencies of a first additional sound increases.

On the basis of the above, the notification control unit 120 may further perform the following process. For example, when the risky physical object is located in the first region A1, the notification control unit 120 of the first embodiment may change a mode of the first additional sound NS1-$p$ on the basis of the position of the risky physical object in the first region A1. More specifically, when the risky physical object is located in the first region A1, the notification control unit 120 may increase the number of types of frequencies of the first additional sound NS1-$p$ as a direction of the risky physical object viewed from the vehicle M is close to the traveling direction of the mobile object. FIG. 8 is a diagram for describing an example in which the number of types of frequencies of the first additional sound NS1-$p$ increases. For example, if a risky physical object RO is located in the first region A1, the notification control unit 120 may increase the number of types of frequencies of the first additional sound NS1-$p$ when the risky physical object RO is located in a first center region A1-$c$ located in the center portion of the first region A1 in the width direction of the vehicle M as compared with when the risky physical object RO is located in one of a first left side region A1-1 and a first right side region A1-$r$ at both left and right sides of the first center region A1-$c$ in the first region A1. In FIG. 8, an example in which the speaker unit 60 is caused to output first additional sounds NS1-1, NS1-2, and NS1-3 when the risky physical object RO is located in the first center region A1-$c$ and the speaker unit 60 is caused to output the first additional sound NS1-1 when the risky physical object RO is located in the first right side region A1-$r$ is shown. The notification control unit 120 is not limited to classifications such as the first center region A1-$c$, the first left region A1-1, and the first right region A1-$r$. The notification control unit 120 may classify the position of the risky physical object RO by a smaller increment and change the type of frequency of the first additional sound NS1-$p$.

Figure 9:
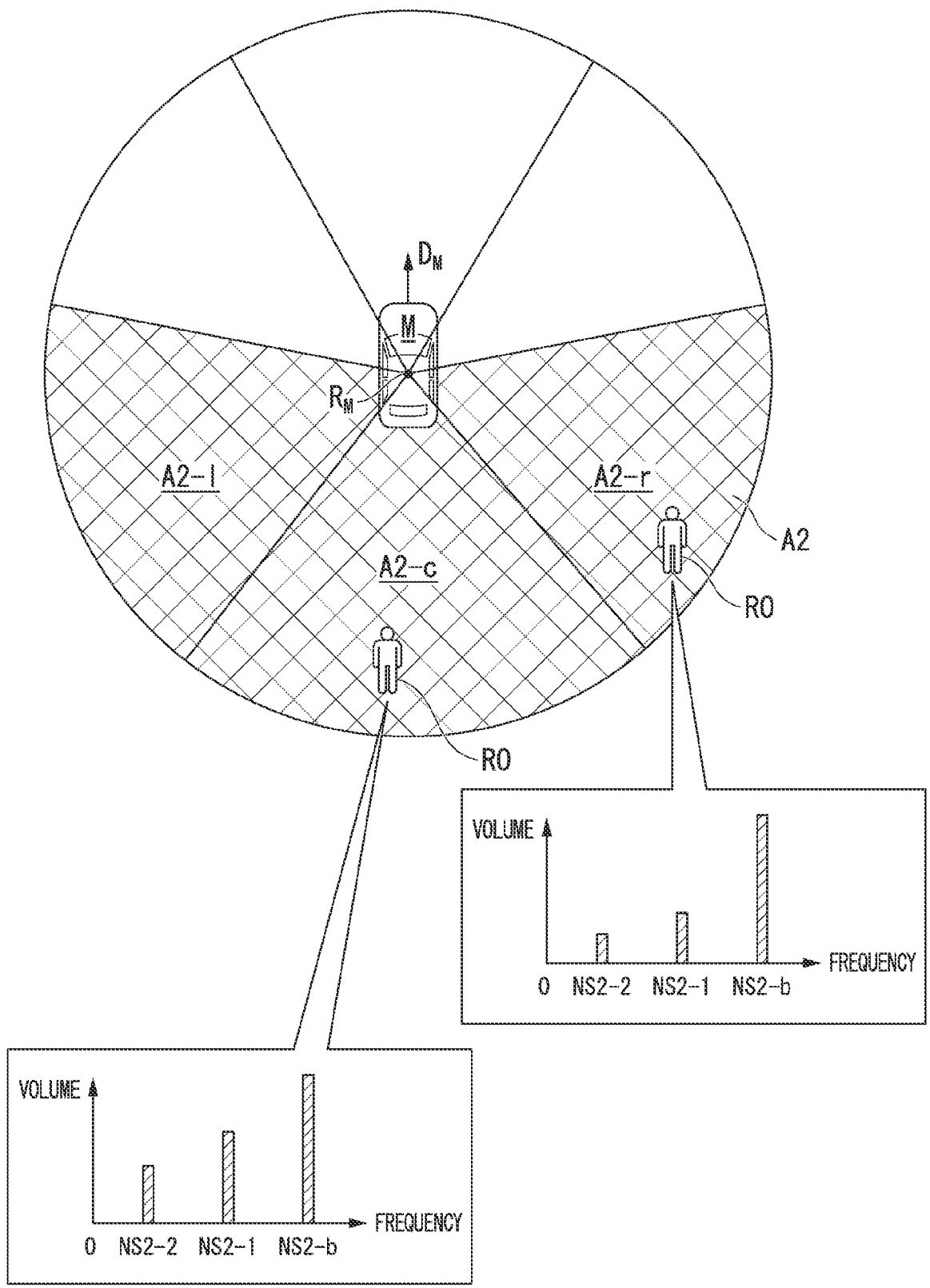
FIG. 9 is a diagram for describing an example in which a volume of a second additional sound increases.

Also, the notification control unit 120 may further perform the following process. For example, when a risky physical object is located in the second region A2, the notification control unit 120 of the first embodiment may change a mode of the second additional sound NS2-$q$ on the basis of a position of the risky physical object within the second region A2. More specifically, the notification control unit 120 may be configured to increase a volume of the second additional sound NS2-$q$ as a direction of the risky physical object viewed from the vehicle M is close to a direction opposite to a traveling direction of the vehicle M when the risky physical object is located in the second region A2. FIG. 9 is a diagram for describing an example in which the volume of the second additional sound NS2-$q$ increases. For example, the notification control unit 120 may be configured to increase a volume of the second additional sound NS2-$q$ when the risky physical object RO is located in a second center region A2-$c$ located in a center portion of the second region A2 in a width direction of the mobile object as compared with when the risky physical object RO is in one of a second left side region A2-1 and a second right side region A2-$r$ located at both left and right sides of the second center region A2-$c$ of the second region A2 if the risky physical object RO is located in the second region A2. The notification control unit 120 is not limited to classifications such as the second center region A2-$c$, the second left region A2-1, and the second right region A2-$r$. The notification control unit 120 may classify the position of the risky physical object RO by a smaller increment and change the volume of the second additional sound NS2-$q$.

Alternatively, the notification control unit 120 may be configured to change the volume of the first additional sound NS1-$p$ on the basis of the position of the risky physical object RO within the first region A1 when the risky physical object RO is located in the first region A1 or may be configured to change the type of frequency of the second additional sound NS2-$q$ on the basis of the position of the risky physical object RO within the second region A2 when the risky physical object RO is located in the second region A2.

[Sound Image Localization and Control According to Distance]

Figure 10:
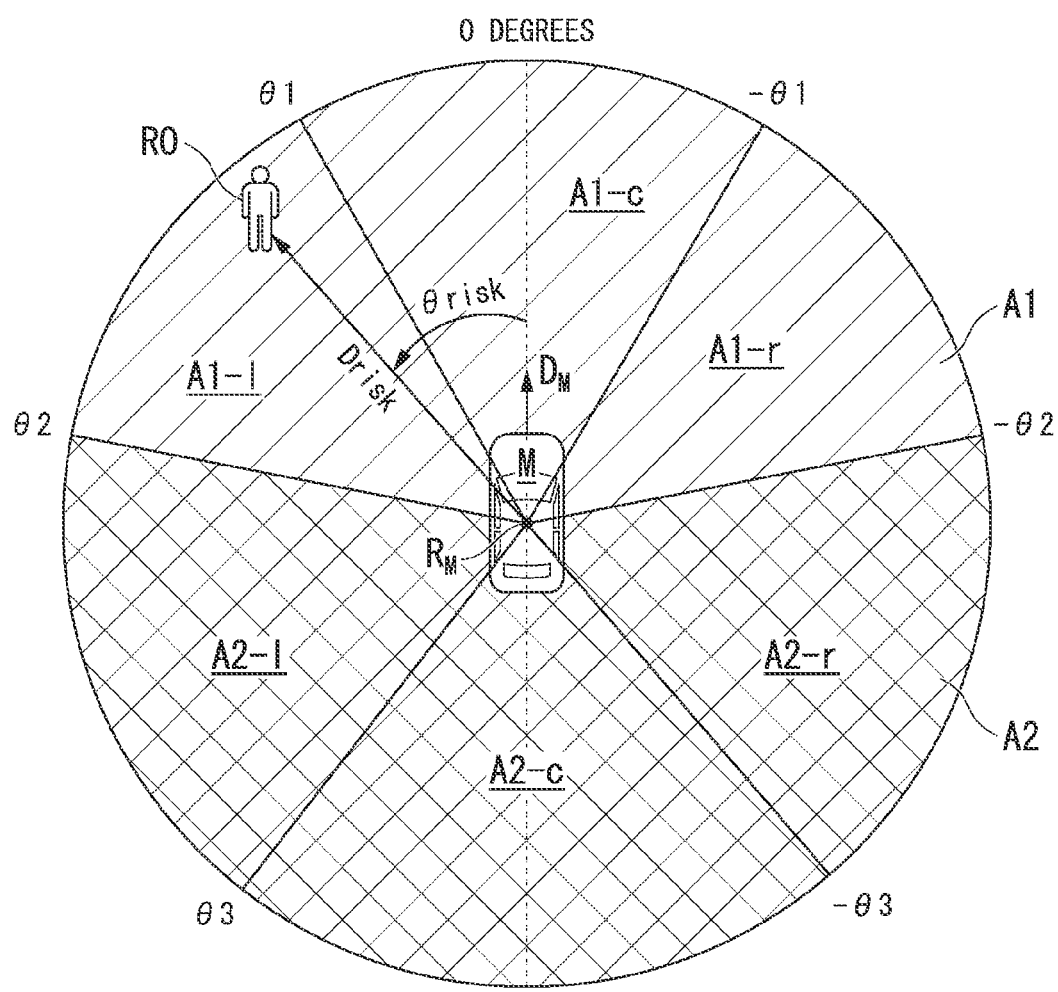
FIG. 10 is a diagram showing definitions of parameters in the embodiment.

The notification control unit 120 may control output modes of one or both of the first notification sound NS1 and the second notification sound NS2 on the basis of one or both of a distance between the vehicle M and the risky physical object and a direction (an angle) of the risky physical object viewed from the vehicle M. FIG. 10 is a diagram showing definitions of parameters in the embodiment. In the following description, a direction identical to the traveling direction $D_M$ of the vehicle M is set to 0 degrees and an angle is defined in a counterclockwise direction. A direction of a boundary line between the first center region A1-$c$ and the first left region A1-1 is defined as θ1, a direction of a boundary line between the first left region A1-1 and the second left region A2-1 is defined as θ2, a direction of a boundary line between the second left region A2-1 and the second center region A2-$c$ is defined as θ3, a direction of a boundary line between the second center region A2-$c$ and the second right region A2-$r$ is defined as −θ3, a direction of a boundary line between the second right region A2-$r$ and the first right region A1-$r$ is defined as −θ2, and a direction of a boundary line between the first right region A1-$r$ and the first center region A1-$c$ is defined as −θ1. Although each region is set left-right symmetrical in the present example, each region may be set left-right asymmetrically. Also, a distance between the vehicle M and the risky physical object RO is defined as Drisk and a direction of the risky physical object RO viewed from the vehicle M (on the assumption of the above-described definitions) is defined as θrisk.

The notification control unit 120 may decide on a position where a sound image of the first notification sound NS1 is localized on the basis of the position of the risky physical object in the first region A1 when the risky physical object is located in the first region A1 or may decide on a position where a sound image of the second notification sound NS2 is localized on the basis of the position of the risky physical object within the second region A2 when the risky physical object is located in the second region A2.

Specifically, the notification control unit 120 causes the sound image to be localized by deciding on the volume of the sound that is output by each speaker on the basis of the following equations. In the following description, SL-FR is a volume of a sound output by the speaker 60FR, SL-FL is a volume of a sound output by the speaker 60FL, SL-RR is a volume of a sound output by the speaker 60RR, and SL-RL is a volume of a sound output by the speaker 60RL. Also, Lbs is a fundamental volume.

(a) When the risky physical object is located in the first center region A1-$c$ $SL\text{-}FR = Lbs \times (\theta 1 - \theta risk)/2\theta 1$ $SL\text{-}FL = Lbs \times (\theta risk + \theta 1)/2\theta 1$ $SL\text{-}RR = SL\text{-}RL = 0$ (b) When the risky physical object is located in the first left region A1-1

$SL\text{-}FL = Lbs \times (\theta 2 - \theta risk)/(\theta 2 - \theta 1)$ $SL\text{-}RL = Lbs \times (\theta risk - \theta 1)/(\theta 2 - \theta 1)$ $SL\text{-}FR = SL\text{-}RR = 0$ (c) When the risky physical object is located in the second left region A2-1

$SL\text{-}FL = Lbs \times (\theta 3 - \theta risk)/(\theta 3 - \theta 2)$ $SL\text{-}RL = Lbs \times (\theta risk - \theta 2)/(\theta 3 - \theta 2)$ $SL\text{-}FR = SL\text{-}RR = 0$ (d) When the risky physical object is located in the second center region A2-$c$ $SL\text{-}RR = Lbs \times \{\theta risk + \theta 3 + 2 \times (180 - \theta 3)\}/\{2 \times (180 - \theta 3)\}$ $SL\text{-}RL = Lbs \times (-\theta risk + \theta 3)/\{2 \times (180 - \theta 3)\}$ $SL\text{-}FR = SL\text{-}FL = 0$ (e) When the risky physical object is located in the second right region A2-$r$ $SL\text{-}FR = Lbs \times (\theta 3 + \theta risk)/(\theta 3 - \theta 2)$ $SL\text{-}RR = Lbs \times (-\theta risk - \theta 2)/(\theta 3 - \theta 2)$ $SL\text{-}FL = SL\text{-}RL = 0$ (f) When the risky physical object is located in the first right region A1-$r$ $SL\text{-}FR = Lbs \times (\theta 2 + \theta risk)/(\theta 2 - \theta 1)$ $SL\text{-}RR = Lbs \times (-\theta risk - \theta 1)/(\theta 2 - \theta 1)$ $SL\text{-}FL = SL\text{-}RL = 0$ By localizing the sound image in this way, it is possible to intuitively inform the driver of the position of the risky physical object RO especially in a lateral direction.

[Notification Sound Control According to Direction and Degree of Proximity]

The notification control unit 120 may control the tempo and volume of the first notification sound NS1 or the second notification sound NS2 as follows on the basis of the direction θrisk and the distance Drisk of the risky physical object RO.

Figure 11:
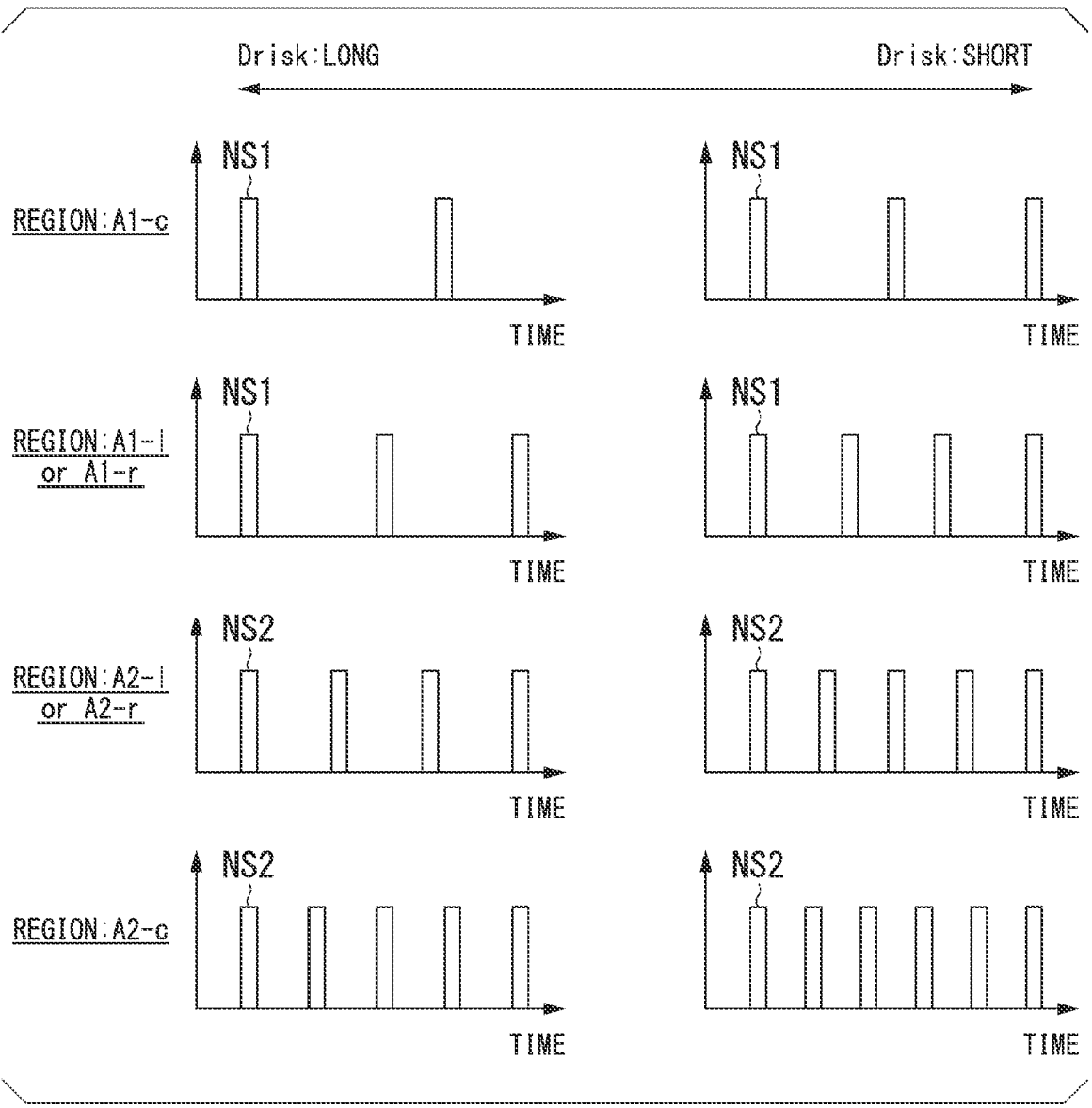
FIG. 11 is a diagram for describing an example in which the tempo of the notification sound is changed.

For example, the notification control unit 120 decreases the tempo of the first notification sound NS1 as the direction of the risky physical object RO viewed from the vehicle M is close to the traveling direction $D_M$ of the vehicle M when the risky physical object is located in the first region A1 or increases the tempo of the second notification sound NS2 as the direction of the risky physical object RO viewed from the vehicle M is close to the direction opposite to the traveling direction $D_M$ of the vehicle M when the risky physical object RO is located in the second region A2. FIG. 11 is a diagram for describing an example in which the tempo of the notification sound is changed. As shown in FIG. 11, the notification control unit 120 may be configured to decrease the tempo of the first notification sound NS1 when the risky physical object RO is located in the first center region A1-c as compared with when the risky physical object RO is located in the first left region A1-1 or the first right region A1-r if the risky physical object RO is located in the first region A1. Because the driver often pays attention to the front side of the vehicle M, such control is intended to prevent excessive notifications. Also, this is based on the consideration that the attention can be effectively aroused because the notification is provided with a high sound including an integer-order harmonic overtone in relation to the front side. Thus, the stress given to the driver can be reduced by outputting the first notification sound NS1.

The notification control unit 120 may be configured to increase the tempo of the second notification sound NS2 when the risky physical object RO is located in the second center region A2-c as compared with when the risky physical object RO is located in the second left region A2-1 or the second right region A2-r if the risky physical object RO is located in the second region A2. Furthermore, assuming that the distance Drisk is the same, the notification control unit 120 may set the slowest tempo of the second notification sound NS2 when the risky physical object RO is located in the second region A2 to the tempo faster than the fastest tempo of the first notification sound NS1 when the risky physical object RO is located in the first region A1.

The notification control unit 120 is not limited to classifications such as the first center region A1-c, the first left region A1-1, the first right region A1-r, the second center region A2-c, the second left region A2-1, and the second right region A2-r. The notification control unit 120 may classify the position of the risky physical object RO by a smaller increment and change the tempo of the first notification sound NS1 or the second notification sound NS2.

Figure 12:
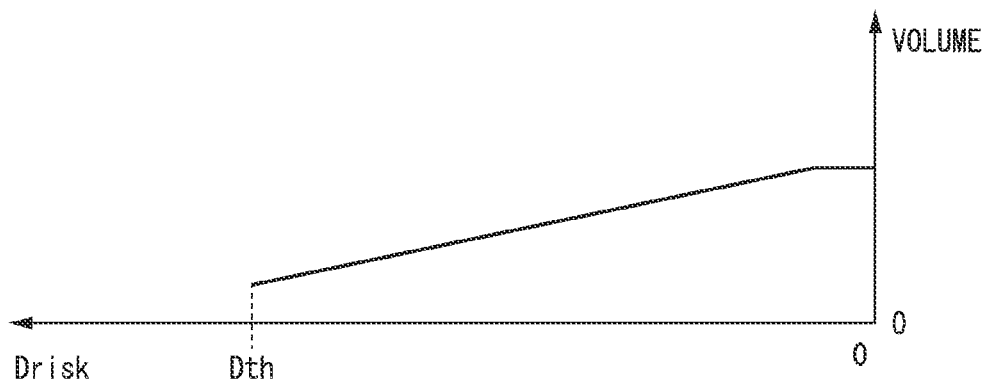
FIG. 12 is a diagram showing an example of volume control corresponding to a distance.

The notification control unit 120 may increase the tempo of the first notification sound NS1 or the second notification sound NS2 as the distance Drisk decreases, regardless of which region the risky physical object RO is located in. Also, the notification control unit 120 may increase the volume of the first notification sound NS1 or the second notification sound NS2 as the distance Drisk decreases. FIG. 12 is a diagram showing an example of volume control corresponding to the distance Drisk. In FIG. 12, Dth denotes a distance at which notification sound output control is started and may be identical to a distance from the vehicle M to an outer edge of the region A1 or A2.

Figure 13:
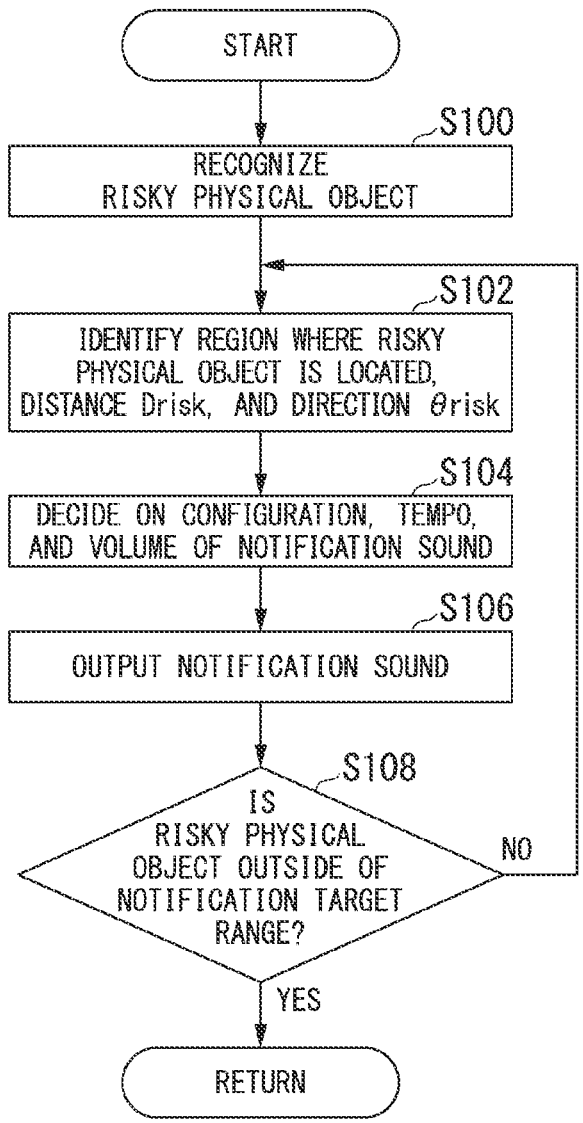
FIG. 13 is a flowchart showing an example of a flow of a process executed by a driving assistance device.

FIG. 13 is a flowchart showing an example of a flow of a process executed by the driving assistance device 100. First, the recognition unit 110 recognizes a risky physical object (step S100). Subsequently, the recognition unit 110 identifies a region where the risky physical object is located, a distance Drisk to the risky physical object, and a direction θrisk of the risky physical object (step S102).

Subsequently, the notification control unit 120 decides on the configuration, tempo, and volume of a notification sound (step S104) and causes the speaker unit 60 to output a notification sound (step S106).

Subsequently, the recognition unit 110 determines whether or not the position of the risky physical object is outside of the notification target range (including non-recognition) (step S108). "Outside of the notification target range" indicates a state in which the distance from the vehicle M is greater than Dth described above. When the position of the risky physical object is outside of the notification target range, the process of the present flowchart ends. When the position of the risky physical object is not outside of the notification target range, the process returns to step S102.

According to the first embodiment described above, it is possible to allow the occupant to intuitively recognize the position or direction of the risky physical object located near the mobile object (the vehicle M).

Second Embodiment

A second embodiment will be described below. A driving assistance device of the second embodiment changes a configuration of a notification sound according to whether a risky physical object RO is located within a first region A1 or a second region A2 without performing the configuration change control of the first notification sound NS1 within the first region A1 or the configuration change control of the second notification sound NS2 within the second region A2 described with reference to FIGS. 8 and 9 in the first embodiment. That is, the driving assistance device of the second embodiment causes a speaker unit 60 to output a first notification sound NS1 including a first fundamental sound NS1-b and a first additional sound NS1-p (p=1, 2, . . . ) that is an integer-order harmonic overtone having an integer multiple of a frequency of the first fundamental sound NS1-b when the risky physical object RO is located within the first region A1 and causes the speaker unit 60 to output a second notification sound NS2 including a second fundamental sound NS2-b and a second additional sound NS2-q (q=1, 2, . . . ) having a frequency different from a frequency that is 1/n times a frequency of the second fundamental sound NS2-b when the risky physical object RO is located within the second region A2. Other control may be similar to that in the first embodiment. Thereby, a type of effect that is the same as that of the first embodiment can be obtained with simpler control.

Third Embodiment

Figure 14:
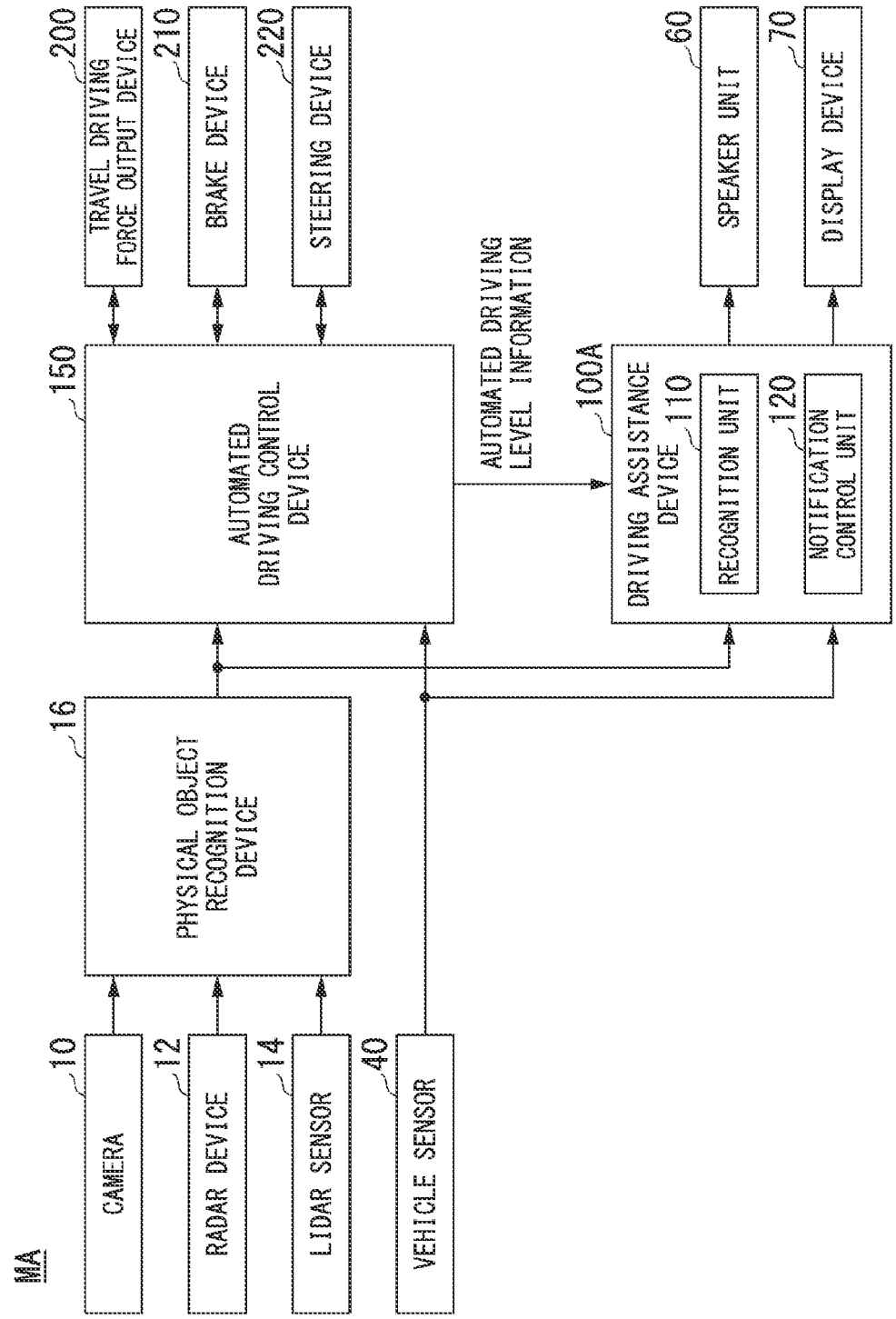
FIG. 14 is a diagram showing equipment mounted in a vehicle based on a driving assistance device according to a third embodiment.

A third embodiment will be described below. A driving assistance device according to the third embodiment is mounted in an automated driving vehicle. FIG. 14 is a diagram showing equipment mounted in a vehicle MA based on a driving assistance device 100A according to the third embodiment. The driving assistance device 100A is mounted in the vehicle MA together with an automated driving control device 150. Output data from a camera 10, a radar device 12, a LIDAR sensor 14, a physical object recognition device 16, and a vehicle sensor 40 is also input to the automated driving control device 150. In addition to these, the output data of a navigation device and a micro processing unit (MPU) may also be input to the automated driving control device 150. The automated driving control device 150 recognizes a surrounding situation of the vehicle MA, generates a target trajectory (accompanied by a speed element) for the vehicle MA by recognizing a region where the vehicle MA can travel while avoiding contact with obstacles, and controls a travel driving force output device 200, a brake device 210, a steering device 220, and the like so that the vehicle MA can travel along the target trajectory. The travel driving force output device 200 includes an engine, a travel motor, and the like. Because details of the automated driving technology are known in various documents, further description is omitted.

The automated driving control device 150 is further connected to a steering grip sensor 160 and an in-vehicle camera 170. The steering grip sensor 160 is used for detecting whether or not a driver is gripping a steering wheel, which is a steering operation element, and the in-vehicle camera 170 images the head of the driver from the front. The automated driving control device 150 determines whether or not the driver is gripping the steering wheel (hands-on) with reference to the output of the steering grip sensor 160 and determines whether or not the driver is visually recognizing a traveling direction of the vehicle MA (eyes-on) by analyzing an image captured by the in-vehicle camera 170. The automated driving control device 150 permits one or both of a process of releasing the steering wheel (hands-off) and a process of directing a visual line to a direction other than the traveling direction of the vehicle MA (eyes-off) on the basis of a surrounding environment of the vehicle MA (a type of road on which the vehicle MA is traveling) or the speed of the vehicle MA. This permissive state may be referred to as an automated driving level. When an unacceptable state has occurred (for example, when the driver has separated his or her hands from the steering wheel in a hands-on state), the automated driving control device 150 performs a process of switching driving to manual driving or the like if the state is not eliminated after the driver is notified of the state so that the state is eliminated. The automated driving control device 150 outputs information about the automated driving level to the driving assistance device 100A.

The driving assistance device 100A automatically stops the operation when both hands-off and eyes-off are permitted with reference to information about the automated driving level. This is because, in this state, the driver has no obligation to monitor the surroundings of the vehicle MA temporarily and the automated driving control device 150 performs control to avoid contact with a risky physical object. Other functions are similar to those of the first or second embodiment.

According to the third embodiment described above, it is possible to perform control that is highly compatible with automated driving.

Fourth Embodiment

A fourth embodiment will be described below. A driving assistance device according to the fourth embodiment is mounted in a two-wheeled vehicle on which a driver rides with a helmet. FIG. 15 is a diagram showing equipment mounted in a two-wheeled vehicle MB based on a driving assistance device 100B according to the fourth embodiment. Instead of controlling a speaker unit 60, the driving assistance device 100B instructs a wireless communication device 80 to transmit instruction information about a notification sound. The wireless communication device 80 performs communication based on a communication standard such as Bluetooth (registered trademark).

A receiver 310, a left ear speaker 320-L, and a right ear speaker 320-R are attached to a helmet 300 worn by the driver. On the basis of the instruction information received from the wireless communication device 80, the receiver 310 causes one or both of the left ear speaker 320-L and the right ear speaker 320-R to output notification sounds.

The present embodiment is similar to the first or second embodiment except that it is difficult to express a front-rear direction when sound image localization is controlled. That is, the recognition unit 110 and the notification control unit 120 perform a process similar to the process described in the first or second embodiment, decide on the configuration, tempo, and volume of a first notification sound NS1 and a second notification sound NS2, and cause the wireless communication device 80 to transmit the instruction information for causing the left ear speaker 320-L and/or the right ear speaker 320-R to output the notification sounds accordingly.

In the fourth embodiment, earphones with a wireless function may be used instead of the speakers provided inside of the helmet.

According to the fourth embodiment described above, although a degree of freedom of sound image localization is reduced, effects similar to those of the first or second embodiment can be obtained in other respects.

Although modes for carrying out the present invention have been described using embodiments, the present invention is not limited to the embodiments, and various modifications and substitutions can also be made without departing from the scope and spirit of the present invention.

What is claimed is:

1. A driving assistance device comprising:
    a storage device storing a program; and
    a hardware processor connected to the storage device,
    wherein the hardware processor reads and executes the program stored in the storage device to:
    recognize a risky physical object located near a mobile object on the basis of an output of a physical object detection device,
    cause at least one speaker to output a notification sound on the basis of a position of the risky physical object, and
    when the notification sound is output, cause the at least one speaker to output a first notification sound if the risky physical object is located in a first region including a region in front of the mobile object and cause the at least one speaker to output a second notification sound if the risky physical object is located in a second region including a region behind the mobile object, and
    wherein the first notification sound is a sound having a pitch different from that of the second notification sound,
    the first notification sound includes a first fundamental sound and a first additional sound, and
    the hardware processor changes a mode of the first additional sound on the basis of a position of the risky physical object within the first region when the risky physical object is located in the first region.

2. The driving assistance device according to claim 1, wherein the first notification sound is higher than the second notification sound.

3. The driving assistance device according to claim 1, wherein the first additional sound is an integer-order harmonic overtone having an integer multiple of a frequency of the first fundamental sound.

4. The driving assistance device according to claim 1, wherein the hardware processor increases the number of types of frequencies of the first additional sound as a direction of the risky physical object viewed from the mobile object is close to a traveling direction of the mobile object when the risky physical object is located in the first region.

5. The driving assistance device according to claim 1, wherein the hardware processor increases the number of types of frequencies of the first additional sound when the risky physical object is located in a first center region located in a center portion of the first region in a width direction of the mobile object as compared with when the risky physical object is in one of a first left side region and a first right side region located at both left and right sides of the first center region of the first region.

6. The driving assistance device according to claim 1, wherein the second notification sound includes a second fundamental sound and a second additional sound having a frequency different from a frequency that is 1/n (n is a natural number) times a frequency of the second fundamental sound.

7. The driving assistance device according to claim 6, wherein the hardware processor changes a mode of the second additional sound on the basis of a position of the risky physical object within the second region when the risky physical object is located in the second region.

8. The driving assistance device according to claim 7, wherein the hardware processor raises a volume of the second additional sound as a direction of the risky physical object viewed from the mobile object is close to a direction opposite to a traveling direction of the mobile object when the risky physical object is located in the second region.

9. The driving assistance device according to claim 7, wherein the hardware processor raises a volume of the second additional sound when the risky physical object is located in a second center region located in a center portion of the second region in a width direction of the mobile object as compared with when the risky physical object is in one of a second left side region and a second right side region located at both left and right sides of the second center region of the second region.

10. The driving assistance device according to claim 1, wherein the hardware processor decreases a tempo of the first additional sound as a direction of the risky physical object viewed from the mobile object is close to a traveling direction of the mobile object when the risky physical object is located in the first region.

11. The driving assistance device according to claim 1, wherein the hardware processor increases a tempo of the second additional sound as a direction of the risky physical object viewed from the mobile object is close to a direction opposite to a traveling direction of the mobile object when the risky physical object is located in the second region.

12. The driving assistance device according to claim 1, wherein the hardware processor increases a tempo of the first notification sound or the second additional sound as a distance between the mobile object and the risky physical object decreases.

13. The driving assistance device according to claim 1, wherein the at least one speaker includes a plurality of speakers, and
wherein the hardware processor decides on a position where a sound image of the first notification sound is localized on the basis of a position of the risky physical object within the first region when the risky physical object is located in the first region and decides on a position where a sound image of the second notification sound is localized on the basis of a position of the risky physical object within the second region when the risky physical object is located in the second region.

14. A driving assistance device comprising:
a storage device storing a program; and
a hardware processor connected to the storage device,
wherein the hardware processor reads and executes the program stored in the storage device to:
recognize a risky physical object located near a mobile object on the basis of an output of a physical object detection device,
cause at least one speaker to output a notification sound on the basis of a position of the risky physical object, and
when the notification sound is output, cause the at least one speaker to output a first notification sound if the risky physical object is located in a first region including a region in front of the mobile object and cause the at least one speaker to output a second notification sound if the risky physical object is located in a second region including a region behind the mobile object, and
wherein one of the first notification sound and the second notification sound is a sound including a fundamental sound A and an integer-order harmonic overtone having an integer multiple of a frequency of the fundamental sound A and the other of the first notification sound and the second notification sound is a sound including a fundamental sound B and an additional sound having a frequency different from a frequency that is 1/n (n is a natural number) times a frequency of the fundamental sound B.

15. The driving assistance device according to claim 14, wherein the first notification sound includes a first fundamental sound and a first additional sound that is an integer-order harmonic overtone having an integer multiple of a frequency of the first fundamental sound.

16. The driving assistance device according to claim 14, wherein the second notification sound includes a second fundamental sound and a second additional sound having a frequency different from a frequency that is 1/n (n is a natural number) times a frequency of the second fundamental sound.

17. The driving assistance device according to claim 14, wherein the hardware processor decreases a tempo of the first additional sound as a direction of the risky physical object viewed from the mobile object is close to a traveling direction of the mobile object when the risky physical object is located in the first region.

18. A driving assistance method, which is executed by a computer mounted in a mobile object, the driving assistance method comprising:
recognizing a risky physical object located near the mobile object on the basis of an output of a physical object detection device; and
causing at least one speaker to output a notification sound on the basis of a position of the risky physical object,
wherein outputting the notification sound includes causing the at least one speaker to output a first notification sound if the risky physical object is located in a first region including a region in front of the mobile object and causing the at least one speaker to output a second notification sound if the risky physical object is located in a second region including a region behind the mobile object, and wherein the first notification sound is a sound having a pitch different from that of the second notification sound, the first notification sound includes a first fundamental sound and a first additional sound, and the driving assistance method changes a mode of the first additional sound on the basis of a position of the risky physical object within the first region when the risky physical object is located in the first region.

19. A driving assistance method, which is executed by a computer mounted in a mobile object, the driving assistance method comprising:

recognizing a risky physical object located near the mobile object on the basis of an output of a physical object detection device; and causing at least one speaker to output a notification sound on the basis of a position of the risky physical object, wherein outputting the notification sound includes causing the at least one speaker to output a first notification sound if the risky physical object is located in a first region including a region in front of the mobile object and causing the at least one speaker to output a second notification sound if the risky physical object is located in a second region including a region behind the mobile object, and wherein one of the first notification sound and the second notification sound is a sound including a fundamental sound A and an integer-order harmonic overtone having an integer multiple of a frequency of the fundamental sound A and the other of the first notification sound and the second notification sound is a sound including a fundamental sound B and an additional sound having a frequency different from a frequency that is $1/n$ (n is a natural number) times a frequency of the fundamental sound B.

20. The driving assistance method according to claim 18, wherein the first additional sound is an integer-order harmonic overtone having an integer multiple of a frequency of the first fundamental sound.

* * * * *